United States Patent
Pham

(10) Patent No.: US 12,289,385 B2
(45) Date of Patent: Apr. 29, 2025

(54) AUDIO SYSTEM

(71) Applicant: Shure Acquisition Holdings, Inc., Niles, IL (US)

(72) Inventor: Richard Bao Pham, Mission Viejo, CA (US)

(73) Assignee: Shure Acquisition Holdings, Inc., Niles, IL (US)

( * ) Notice: Subject to any disclaimer, the term of this patent is extended or adjusted under 35 U.S.C. 154(b) by 13 days.

(21) Appl. No.: 17/586,043

(22) Filed: Jan. 27, 2022

(65) Prior Publication Data
US 2023/0300223 A1 Sep. 21, 2023

(51) Int. Cl.
*H04L 69/16* (2022.01)
*H04L 65/65* (2022.01)
*H04R 3/00* (2006.01)

(52) U.S. Cl.
CPC .......... *H04L 69/16* (2013.01); *H04L 65/65* (2022.05); *H04R 3/00* (2013.01); *H04R 2420/07* (2013.01)

(58) Field of Classification Search
CPC ........ H04L 69/16; H04L 65/65; H04L 65/70; H04N 21/233; H04N 21/2368; H04N 21/4341; H04N 21/236; H04N 19/136; H04R 3/00; H04R 2420/07; G11B 27/10; G11B 27/00
See application file for complete search history.

(56) References Cited

U.S. PATENT DOCUMENTS

| | | | | |
|---|---|---|---|---|
| 8,185,674 B2* | 5/2012 | Moore | ............... | H04N 21/8106 710/10 |
| 2004/0098633 A1* | 5/2004 | Lienhart | ............... | H04N 21/242 713/400 |
| 2007/0130596 A1* | 6/2007 | Wirick | ............. | H04N 21/64307 348/E7.071 |
| 2008/0294276 A1* | 11/2008 | Nakayama | ............ | H04L 12/437 700/94 |
| 2010/0023638 A1* | 1/2010 | Bowman | ................. | H04L 65/80 709/231 |
| 2011/0217025 A1* | 9/2011 | Begen | ................. | H04N 21/2368 386/338 |
| 2012/0206650 A1* | 8/2012 | Lin | ................... | H04N 21/43072 348/E9.034 |
| 2016/0078903 A1* | 3/2016 | Chitnis | ................... | H04N 5/765 386/219 |
| 2016/0105473 A1* | 4/2016 | Klingbeil | ............... | H04L 65/403 370/260 |
| 2016/0294912 A1* | 10/2016 | Lee | .................. | H04N 21/41265 |
| 2020/0106822 A1* | 4/2020 | Roncero Izquierdo | | ...................... H04L 65/764 |
| 2021/0132895 A1* | 5/2021 | Cengarle | ................. | G10L 25/06 |
| 2022/0108120 A1* | 4/2022 | Van Wiemeersch | | ......................... G07C 9/00563 |

OTHER PUBLICATIONS

J. Escobar, C. Partridge and D. Deutsch, "Flow synchronization protocol," in IEEE/ACM Transactions on Networking, vol. 2, No. 2, pp. 111-121, Apr. 1994, doi: 10.1109/90.298430. (Year: 1994).*

(Continued)

*Primary Examiner* — Rachel J Hackenberg
(74) *Attorney, Agent, or Firm* — Banner & Witcoff, Ltd.

(57) ABSTRACT

An audio system that synchronizes multiple audio devices with reduced timing overhead. For example, the audio system may utilize a multi-dimensional buffer to efficiently receive, synchronize, process, and send audio data.

20 Claims, 10 Drawing Sheets

(56) References Cited

OTHER PUBLICATIONS

Stem Ecosystem™, Medium Conference Room Reference Design, downloaded from the Internet Dec. 20, 2021, 2 pages.
Stem Ecosystem™, Large Conference Room Reference Design, downloaded from the Internet Dec. 9, 2021, 2 pages.
Stem Ecosystem™, Stem Hub & Hub Express Communication Center Specifications Sheet, 2021, 1 page.
Stem Ecosystem™, Stem Technical FAQ Letter, Jun. 8, 2021, 16 pages.
Ecosystem Comparison, 2021, 5 pages.

\* cited by examiner

AUDIO SYSTEM

BACKGROUND

Many existing audio systems are limited in their configurability. For example, in some video and/or audio conference system, the number of microphones, speakers, and other devices connected to the system may be unduly limited. One reason for this, particularly for digital audio systems, is that a large number of connected devices may require a large amount of processing resources, such as processing resources involved in multiplexing of communications between the devices, audio handling, digital signal processing, and the like.

SUMMARY

The following summary presents a simplified summary of certain features. The summary is not an extensive overview and is not intended to identify key or critical elements.

Audio systems are described herein that may efficiently handle a larger number of connected devices, referred to herein by way of example as endpoints. The endpoints may have microphones, speakers, and/or other audio features useful to an audio system. The audio system may be communicatively arranged as at least one hub and a plurality of endpoints connected (via wire or wirelessly) with the hub. The hub may use certain communication protocols that allow for reduced overhead and processing when receiving audio data from the various endpoints. For example, the hub and the endpoints may send and receive audio data in Universal Datagram Protocol (UDP) datagrams, which may be directly encapsulated in transport-layer datagrams such as an Internet Protocol (IP) datagrams. While UDP in combination with Real-Time Transport Protocol (RTP) datagrams (and possibly also IP datagrams) is also possible, the use of RTP may be less efficient because it may involve a large number of sockets and ports, along with associated increased processing resource demand. By using UDP without RTP, and possibly in combination with IP, the hub may be able to communicate with a large number of endpoints using the same socket and the same port. This may allow for less processing resource demand and less processing and audio handling delay on the part of the hub. The hub may also utilize an efficient multi-dimensional (e.g., two-dimensional) circular buffer for handling and synchronizing audio data received from the various endpoints based on which of a plurality of time windows the audio data is received in.

Further aspects as described herein provide a method of operating an audio system, as well as the audio system itself and any software for operating the audio system or implementing the method. The method may include, for example, receiving, by a first device and from a plurality of other devices, a plurality of datagrams, such as Internet Protocol (IP) datagrams. Each of the plurality of datagrams may encapsulate another type of datagram, such as a User Datagram Protocol (UDP) datagram. Each of the encapsulated datagrams (e.g., each of the UDP datagrams) may, in turn, comprise audio data. The method may further include determining a fist subset of the plurality of datagrams (e.g., the IP datagrams) based on which of those datagrams are received within a first time window. The audio data of the first subset of datagrams may be combined to generate combined audio data, and another datagram comprising the combined audio data may be sent, such as by the first device to one or more of the plurality of other devices. The sent datagram may be, for example, a first datagram (for example, an IP datagram) encapsulating a second datagram (for example, a UDP datagram) that contains the combined audio data.

Further aspects as described herein provide a method of operating an audio system, as well as the audio system itself and any software for operating the audio system or implementing the method. The method may include, for example, receiving, by a first device, a plurality of datagrams (for example, IP datagrams) from a plurality of other devices, wherein each of the plurality of datagrams may encapsulate another datagram (for example, a UDP datagram) that comprises audio data. The method may further include synchronizing the audio data using a multi-dimensional buffer indexed to the plurality of other devices and indexed to a series of time windows. For each time window of the series of time windows, the audio data may be combined to generate combined audio data. For each time window of the series of time windows, a datagram comprising the combined audio data may be sent, such as by the first device to one or more of the plurality of other devices. The sent datagram may be, for example, a first datagram (for example, an IP datagram) encapsulating a second datagram (for example, a UDP datagram) that contains the combined audio data.

Further aspects as described herein provide a method of operating an audio system, as well as the audio system itself and any software for operating the audio system or implementing the method. The method may include, for example, receiving, by a first device from a second device, a first plurality of datagrams (for example, a plurality of IP datagrams) that encapsulate a second plurality of datagrams (for example, a plurality of UDP datagrams) that comprises first audio data. Based on a determination that one of the first plurality of datagrams is a first-received datagram from the second device, a clock of the first device may be synchronized with the one of the first plurality of datagrams. Second audio data may be generated based on a signal from a microphone of the first device, and another datagram containing the second audio data may be sent by the first device to the second device at a time that is based on the synchronized clock. The datagram containing the second audio data may be arranged, for example, as one type of datagram (for example, an IP datagram) encapsulating another type of datagram (for example, a UDP datagram) that contains the second audio data.

These and other features and potential advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
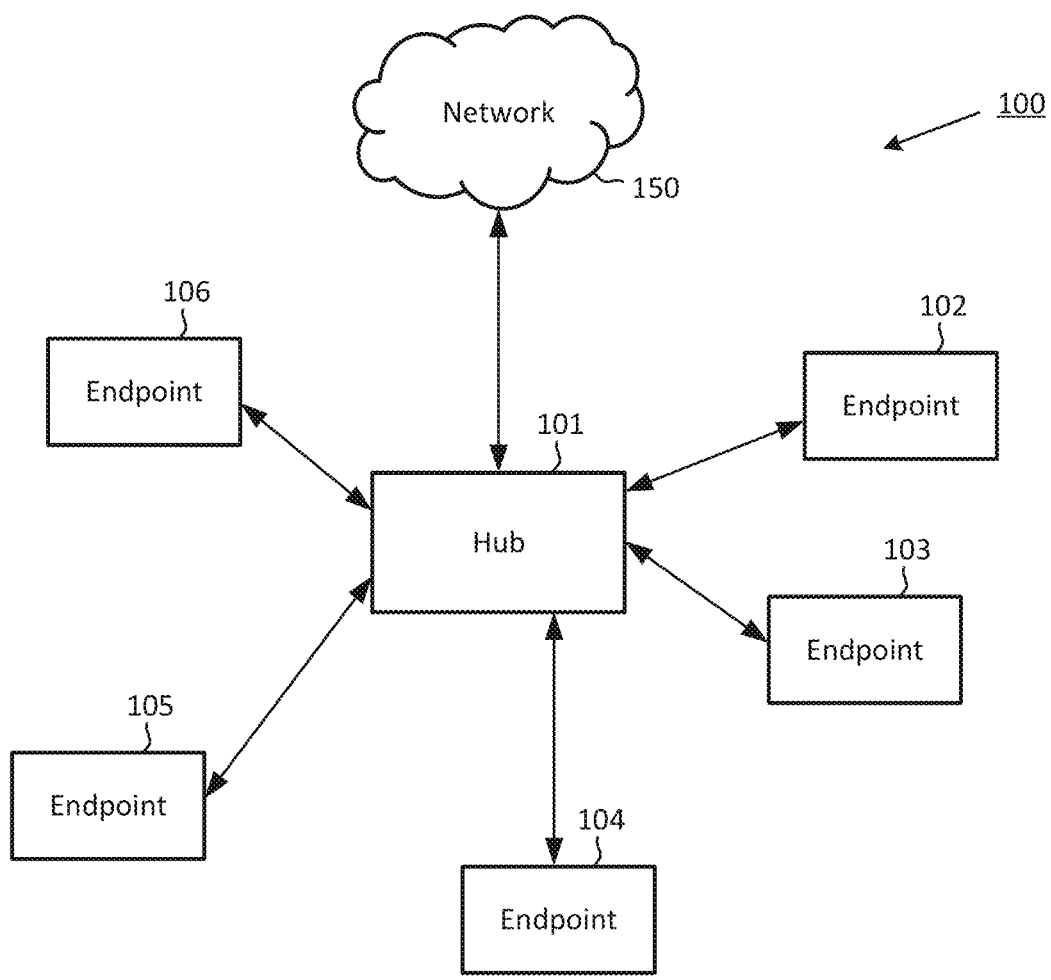
FIG. 1 is a block diagram showing an example audio system.

The accompanying drawings, which form a part hereof, show examples of the disclosure. It is to be understood that the examples shown in the drawings and/or discussed herein are non-exclusive and that there are other examples of how the disclosure may be practiced.

FIG. 1 illustrates an example audio system 100. The audio system 100 may comprise a plurality of elements, such as audio components. The elements may be communicatively connected with one or more of the elements. For example, the audio system 100 may be arranged in any desired network topology. For example, the audio system 100 may be arranged in a hub-and-spoke topology (also known as a star topology), a bus topology, a ring topology, a mesh topology, or as a hybrid of any of these or other topologies. By way of example only, the audio system 100 of FIG. 1 is shown as having a hub-and-spoke (or star) topology, and comprises a hub 101 connected to each of a plurality of other devices 102-106. The other devices 102-106 will be referred to herein, by way of example only, as endpoints 102-106. While five endpoints 102-106 are shown, this is by way of example only, and the audio system 100 may comprise any number of endpoints at any given time. The audio system 100 may further include or be communicatively connected to a network 150. The network 150 may include or be connected to the Internet, an intranet, a local area network (LAN), a wide-area network (WAN), a cellular network, and/or any other type of network. The hub 101 and/or any of the endpoints 102-106 may be or otherwise include a computing device.

The connections between the elements of the audio system 100, illustrated by way of example in FIG. 1 with arrows between the elements, may be bidirectional or unidirectional and may be implemented as any one or more types of connections, such as but not limited to Ethernet connections, universal serial bus (USB) connections, wired connections, wireless connections (such as via Wifi, Bluetooth, and/or near-field communications), high-definition multimedia interface (HDMI) connections, coaxial cable connections, optical fiber connections, and/or any other types of connections.

Each of the endpoints 102-106 may be or otherwise include any type of device, for example a microphone, a speakerphone, a speaker, a video display, or a computer such as a laptop computer, desktop computer, or tablet computer.

The hub 101 and the endpoints 102-106 may be located anywhere with respect to one another. For example, the hub 101 may be located within the same room as one or more of the endpoints 102-106, such as within the same conference room. For example, the hub 101 and the endpoints 102-106 may all be located within the same single room. As another example, the hub 101 may be located in one room and/or one building, and one, more, or all of the endpoints 102-106 may be located in another room and/or in another building. As another example, one or more of the endpoints 102-106 may be in one room and/or in one building, and one or more other(s) of the endpoints 102-106 may be in another room and/or in another building.

Where an endpoint includes a microphone for collecting sound, that endpoint may generate data representing that sound ("audio data"), and send that audio data to the hub 101. Likewise, the hub 101 may send audio data that it receives to the network 150 and/or to one or more of the endpoints 102-106. The hub 101 may only receive audio data from other sources, such as from one or more of the endpoints 102-106, however the hub 101 may also include a microphone for collecting sound and generating its own corresponding audio data, which may be sent to the network 150 and/or to one or more of the endpoints 102-106. For example, assume that a call (audio and/or video call) is in progress between the audio system 101 and another device or system via the network 160. If the endpoint 102 includes a microphone that collects sound, the endpoint 102 may generate audio data based on the collected sound, and send that audio data to the hub 101. In turn, the hub 101 may send that received audio data (or further processed audio data based on the received audio data) to the network 150 and ultimately to the other end of the call. If the other end of the call sends audio data via the network 150, the hub 101 may receive that incoming audio data and forward it to one or more of the endpoints 102-106, such as to those endpoints that include a speaker.

When forwarding audio data to one or more endpoints, the hub 101 may send the audio data to all endpoints connected to the hub 101, regardless of whether any given one of the endpoints is able to utilize the audio data. For example, the hub 101 may send any audio data simultaneously to all of the endpoints 102-106, even if one of the endpoints is, for example, a microphone without a speaker. If an endpoint does not need the audio data received from the hub 101, then the endpoint can simply ignore or discard the audio data. Thus, the hub 101 may blindly send all audio data it receives to any or all of the endpoints regardless of the capabilities (e.g., configurations) of those endpoints. However, the hub 101 may be alternatively configured to know which of the endpoints 102-106 have certain capabilities, and may use that knowledge to determine a subset of the endpoints that audio data should be sent to. For example, the hub 101 may be configured to know that certain of the endpoints have sound collecting capability (e.g., have microphones), and that others of the endpoints have sound emitting capability (e.g., have speakers). Each endpoint 102-106 may communicate its capability to the hub 101, such as via data indicative of the type of endpoint and/or indicative of its capability. Based on this, the hub 101 may determine to which of the endpoints 102-106 the hub 101 should send audio data, and the hub 101 may further determine which of the endpoints 102-106 the hub 101 may be receiving audio data from. For example, if an endpoint indicates that it has sound collecting capability, then the hub 101 may expect audio data from that endpoint. If an endpoint indicates that it has sound emitting capability, then the hub 101 may send audio data to that endpoint when the audio data is generated. As will be explained further below, when the hub 101 knows that an endpoint has sound collecting capability, the hub 101 may assign a resource within its buffer to that endpoint.

Figure 2:
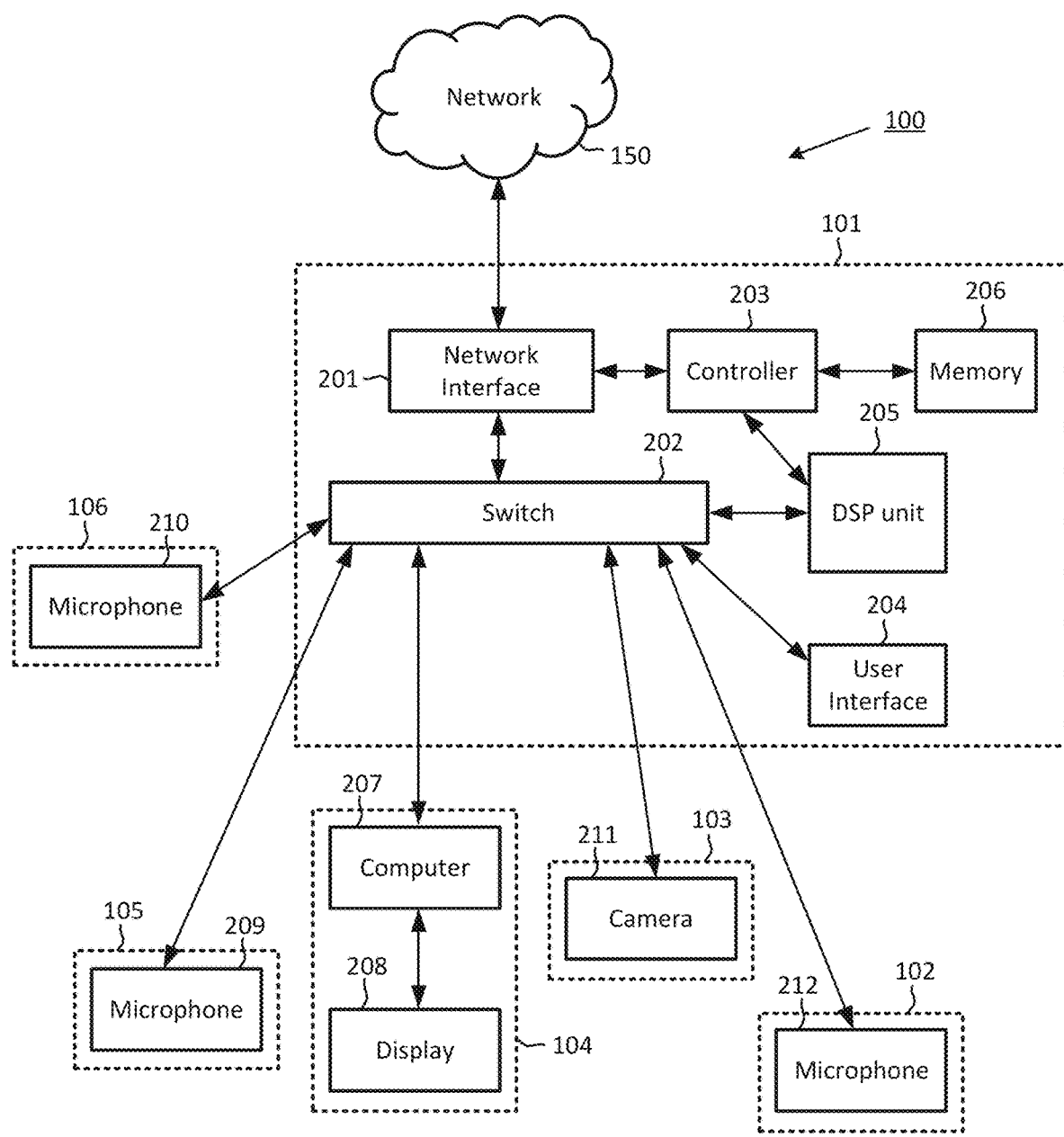
FIG. 2 is a block diagram showing example details of the audio system of FIG. 1.

An example configuration of the audio system 100 is shown in FIG. 2. In this example, the hub 101 may include one or more elements, such as a network interface 201 for communicating with the network 150, a switch 202 for directing data to and/or from one or more of the endpoints 102-106, a control 203 for controlling the switch 202 and/or other features of the hub 101, a user interface 204 for allowing a user to control the hub 101 and/or to provide information to the user, a digital signal processing (DSP) unit 205, and/or memory 206 (or other non-transitory computer-readable medium) for storing data and/or computer-readable instructions. The network interface 201 may include, for example, a modem. The switch 202 may include, for example, an Ethernet switch. The DSP unit 205 may process audio in analog and/or digital form. For example, the DSP unit 205 may perform any desired DSP operation on audio data received or sent via the network interface 201 (e.g., from or to the network 150) and/or via the switch 202 (e.g., from or to an endpoint). For example, the DSP unit 205 may mix multiple audio channels together. The user interface 204 may include, for example, one or more buttons and/or a display such as a touch-sensitive display.

Figure 5:
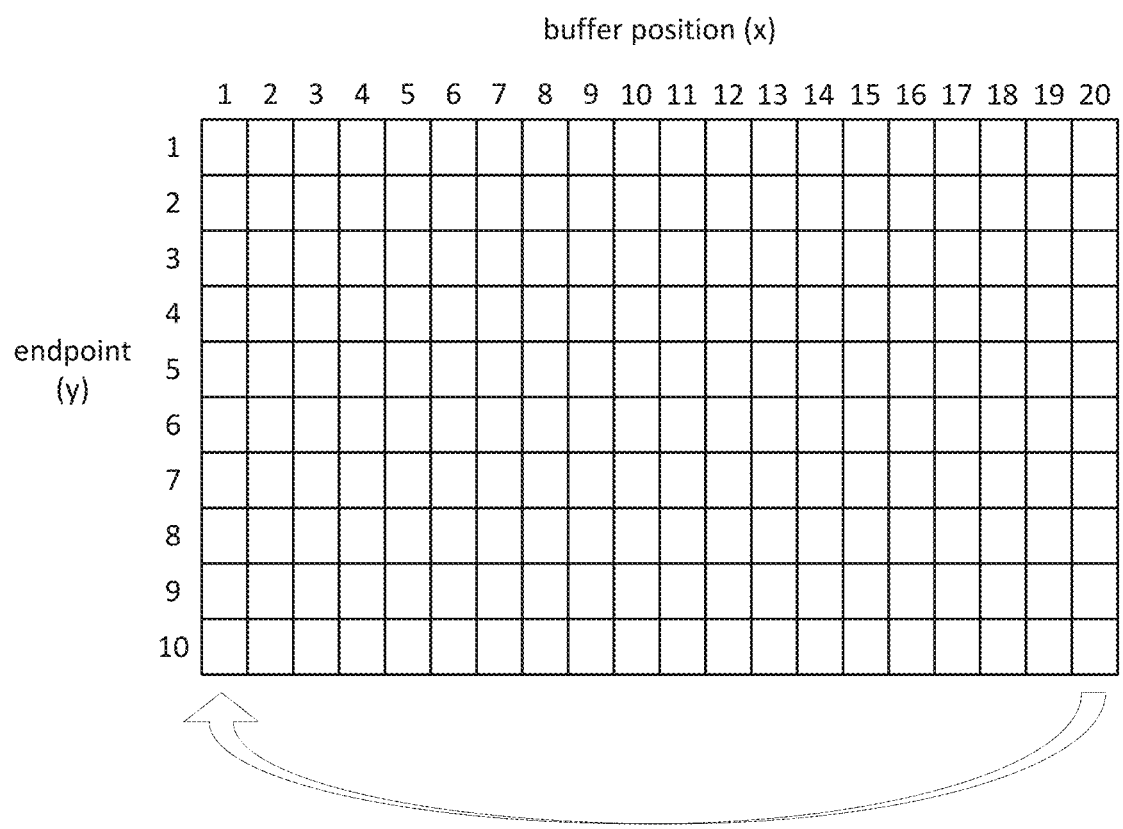
FIG. 5 shows an example organization of a two-dimensional buffer that may be implemented in one or more devices of an audio system such as the audio system of FIG. 1.

The controller 203 may control any or all of the functionality, processes, and/or features of the hub 101. For example, the controller 203 may control the network interface 201, the user interface 204, and/or the switch 202. The controller 203 may include, for example, one or more processors that execute the computer-readable instructions stored in the memory 206. Executing the instructions may cause the hub 101 to perform any of its functionality as described herein. The controller 203 may also include a buffer (for example, stored in the memory 206). As will be described in further detail below, the buffer may be, for example, a multi-dimensional (for example, two-dimensional) circular buffer and may be arranged such as shown in FIG. 5. While certain connections are shown between elements within the hub 101, the elements may be interconnected in any manner desired, such as via a common bus.

In the example of FIG. 2, the endpoints 102, 105, and 106 each include a microphone 212, 209, and 210, respectively, the endpoint 103 includes a camera 211 (such as a video camera, which may include a microphone), and the endpoint 104 includes a computer 207 and a display 208. Moreover, each of the endpoints 102, 105, and 106 (and 103 if the camera 211 includes a microphone) may include a computing device and/or another type of circuitry for generating audio data based on sound collected by their respective microphones 212, 209, and/or 210. The circuitry and/or computing device of each of the endpoints 102, 105, and 106 may be configured to perform, for example, digital signal processing on an analog signal generated by its respective microphone, and to generate the audio data based on the result of the digital signal processing.

The endpoints 103 may include a microphone in addition to the camera 103. In addition to or instead of audio, the endpoint 103 may also send video data, representing images captured by the camera 103, to the hub 101. The hub 101 may send the video data (or further processed video data based on the received video data) to any of the endpoints 102-106 and/or to the network 150.

Audio data sent between the hub 101 and the endpoints 102-106 and/or between the hub 101 and the network 150 may be divided into groups of information referred to herein as datagrams. The term "datagram" as used herein is intended to broadly cover multiple types of data groupings in a packet-switched network architecture, including but not limited to data packets and data frames. Examples of datagrams include, but are not limited to, User Datagram Protocol (UDP) datagrams and Internet Protocol (IP) datagrams.

Figure 3:
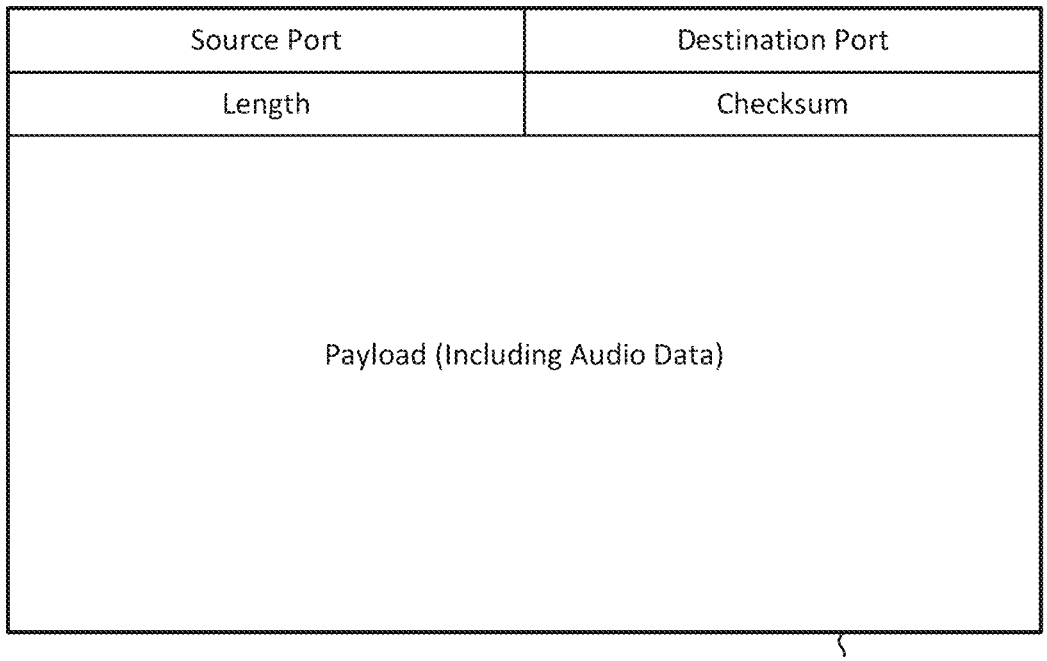
FIG. 3 shows an example of a first type of datagram that may be used for transferring audio data, which in this example is a User Datagram Protocol (UDP) datagram.

FIG. 3 shows an example of a UDP datagram 300. The UDP datagram 300 may include a header that includes the following fields: source port, destination port, length, and a checksum. The UDP datagram 300 may further include a payload region. The payload of the UDP datagram 300 may include any type of desired data, such as the above-mentioned audio data.

Figure 4:
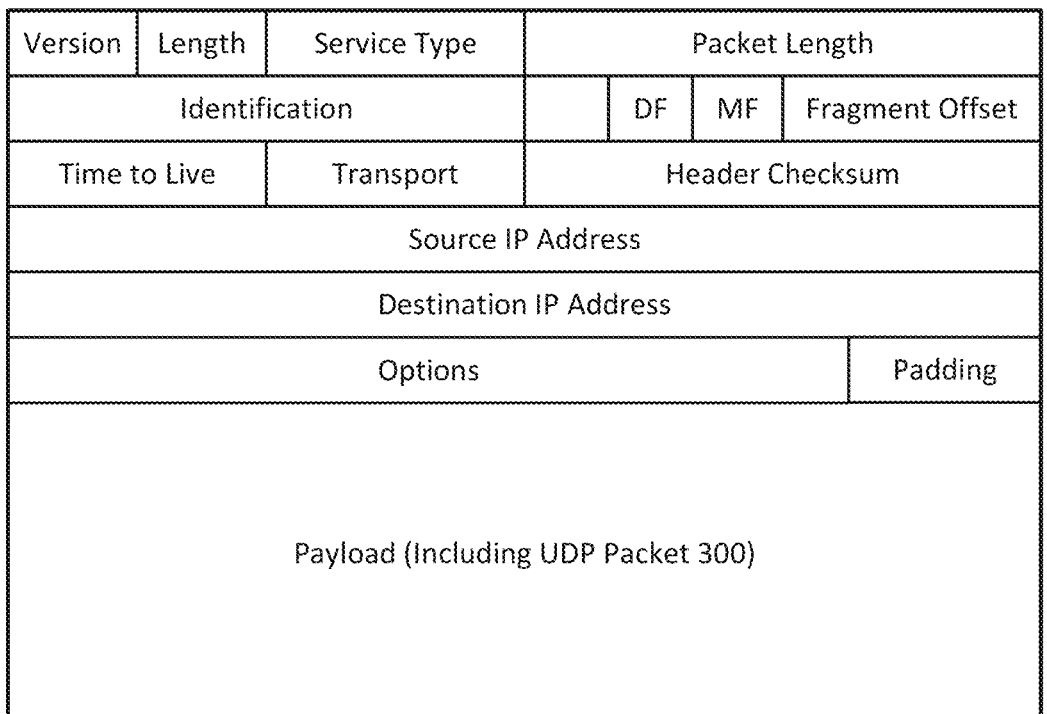
FIG. 4 shows an example of a second type of datagram that may be used for transferring the first type of datagram, which in this example is an Internet Protocol (IP) datagram.

FIG. 4 shows an example of an IP datagram 400, sometimes also referred to as an IP packet. The IP datagram 400 may include a header that includes the following fields: version, length, service type, packet length, identification, DF, MF, fragment offset, time to live, transport, a header checksum, source IP address, destination IP address, options, and padding. The IP datagram 400 may further include a payload region. The payload of the IP datagram 400 may include any type of desired data, such as the above-mentioned UDP datagram 300. In such an example where the UDP datagram 300 is included in the payload of the IP datagram 400, the IP datagram 400 may be considered as encapsulating the UDP datagram 300.

The audio data sent from an endpoint 102-106 to the hub 101 and/or from the hub 101 to an endpoint 102-106 may utilize one or more types of datagrams. For example, audio data generated by an endpoint 102-106 or by the hub 101 may be packaged in the payload portion of a first type of datagram (for example, a UDP datagram), and the first type of datagram may be packaged in the payload portion of (for example, encapsulated by) a second type of datagram (for example, an IP datagram). While this involves two types of datagrams, three or more types of datagrams may be used. For example, a first type of datagram may contain the audio data, the first type of datagram may be encapsulated by a second type of datagram, and the second type of datagram may be encapsulated by a third type of datagram. For example, the audio data may be included in the payload of a Real-Time Transport Protocol (RTP) datagram, the RTP datagram may be encapsulated by a UDP datagram, and the UDP datagram may be encapsulated by an IP datagram. However, using all three layers (RTP/UDP/IP) may utilize an excessive amount of overhead and delay audio data transport. For example, functionality provided by RTP datagrams, such as jitter handling, may not be needed or of particular value for the audio system, and may unnecessarily take up computing resources that may be better used for other functionality or that may not be needed at all. Moreover, using RTP datagrams may involve RTP libraries spinning up a different networking protocol port (and corresponding computing resources), such as a TCP port or a UDP port, for each endpoint connection. Thus, if there are three endpoints, the hub 101 may need to create three different ports, one for each endpoint.

As another example, the audio data may be placed directly into a UDP datagram, without using an RTP datagram. This may avoid the additional overhead and/or other information that would otherwise be introduced by including an intervening RTP datagram layer. The RTP datagram layer, which may sometimes be used to transmit timing information between a receiving device and a sending device, may be less useful when the communication link between the two devices is expected to be of low latency and/or jitter, and thus where, for example, the time of receipt of data by a receiving device may be generally considered similar to the time that the data is sent by a sending device, in comparison to the rate of the data being sent. For example, the latency and/or jitter of the communication link may be expected to be at least an order of magnitude smaller than the datagram sending period (e.g., at least an order of magnitude smaller than the inverse of the datagram sending rate), and thus for practical purposes, potentially an unimportant amount of latency and/or jitter. Moreover, the library (e.g., RTP library) or other subsystem of the hub 101 may use a single (e.g., the same) networking protocol port to communicate with multiple endpoints, such as with of the endpoints 102-106. Thus, a plurality of endpoints connected to the hub 101 may share the same networking protocol port of the hub 101. In fact, even if an even larger number of endpoints are used, say ten endpoints or more, those ten or more endpoints may still only use the same single networking protocol port of the hub 101. For example, each of the endpoints 102-106 may share the same networking protocol port of the hub 101, albeit each endpoint 102-106 may utilize a different physical connection to the hub 101 (for example, a different Ethernet or USB connection to the switch 202 of the hub 101). Where the communication between the hub 101 and the endpoints uses IP datagrams encapsulating UDP datagrams that, in turn, contain audio data (such as shown in FIGS. 3 and 4), the hub 101 may open a single socket with one or more desired configured parameters for the connection, where one of the parameters may indicate UDP. Thus, using UDP without RTP (for example, using IP/UDP) may allow the hub 101 to significantly reduce its computing resources that would otherwise be needed to maintain multiple simultaneous ports.

The hub 101 may have a two-dimensional buffer for receiving audio data from multiple endpoints. For example, the buffer may be logically considered to be arranged as a two-dimensional array, with one dimension of the array representing endpoints and the other dimension of the array representing a position within the buffer for a given endpoint. An example of this buffer is illustrated in FIG. 5, in which there are shown ten rows each associated with a different endpoint y=[1, 10] and twenty columns each associated with a different buffer position x=[1, 20] for each endpoint. The number of columns and rows shown in FIG. 5 are merely an example; the buffer may have any number of columns and rows as desired. Moreover, for all discussions herein of buffer columns and rows, the columns and row may be reversed, such that different columns represent different endpoints and different rows represented different buffer positions for each endpoint. Each "square" within the buffer illustration of FIG. 5 may represent, for example, a different memory location in buffer storage. The illustration of the buffer in FIG. 5 in a tabular form is merely for explanatory purposes, and the buffer may be physically and/or logically arranged in any manner as desired. For example, memory implementing the buffer may be addressed using two-dimensional addressing or using one-dimensional addressing, as desired. In addition, the buffer may be considered to be a two-dimensional circular buffer, in that once buffer position x has been incremented to the maximum value or end of the buffer (in the shown example, x=20), the next increment of buffer position x may result in x being reset to the minimum value or beginning of the buffer (in the shown example, x=1). Thus, the buffer of FIG. 5 may be considered as the logical and topological equivalent of a cylinder, in which the array of FIG. 5 may logically curve or fold around on itself such that column 20 is adjacent to column 1 (as indicated by the curved arrow). In other words, the buffer may be circular in one dimension (e.g., along buffer position x) and linear or otherwise non-circular in the other dimension (e.g., along endpoint y). The buffer may have an index, such as a pointer, that indexes to (for example, identifies) the current position of the buffer, such that the pointer points to the current column x. The index may be updated with a new value of x as appropriate, such as in the manner described further below.

Figure 6:
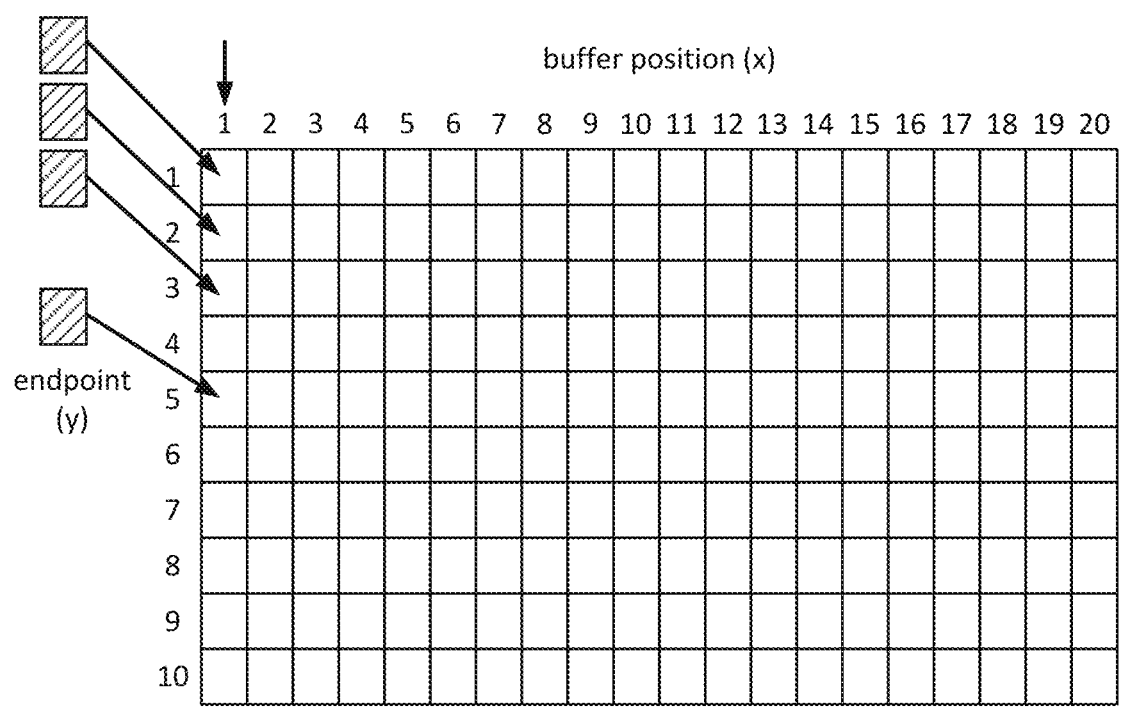
FIG. 6 shows an example of audio data populating a column of the two-dimensional buffer of FIG. 5.

FIG. 6 shows an example of audio data populating a column of the two-dimensional buffer of FIG. 5. In this example, assume that there are five endpoints (for example, the five endpoints 102-106) connected to the hub 101. Each of the endpoints may independently send audio data as the audio data is generated. In the shown example, endpoints 102-106 may be assigned to buffer rows y=1-5, respectively. Thus, for example, endpoint 102 is assigned buffer row y=1 and endpoint 106 is assigned buffer row y=5. Moreover, as shown, endpoints 102, 103, 104, and 106 (y=1, 2, 3, and 5) provide audio data to the hub 101 while the buffer index indicates buffer position x=1 (the index being represented in the figure by the down-directed arrow that is pointing to x=1). The audio data is represented in FIG. 5 as shaded squares, and each element of audio data is populated into the respective row corresponding to the endpoint from which the audio data was provided. Thus, the audio data in this example is populated into column x=1, rows y=1, 2, 3, and 5. In this example, endpoint 105 (assigned to buffer row y=4) did not send audio data corresponding to buffer position x=1. Each shaded square may represent one datagram (e.g., one IP datagram encapsulating one UDP datagram that contains the audio data). Thus, in the shown example, each buffer position x may store up to one datagram of audio data per endpoint. However, multiple datagrams may be stored in each buffer position x for a given endpoint, if desired.

Figure 7:
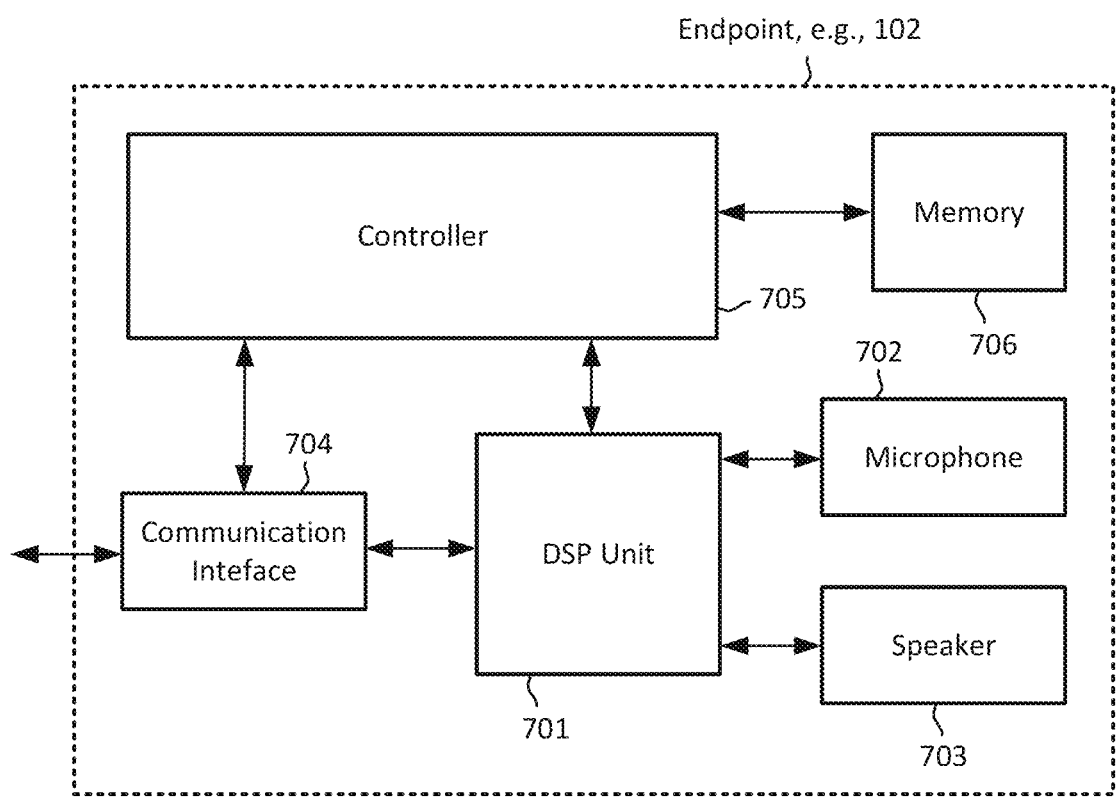
FIG. 7 is a block diagram showing an example of an endpoint.

FIG. 7 is a block diagram of an example endpoint, such as any of the endpoints 102-106. The endpoint may include a digital signal processing (DSP) unit 701, a microphone 702, a speaker 703, a communication interface 704, a controller 705, and/or memory 706 (or other non-transitory computer-readable medium) for storing data and/or computer-readable instructions. Not all endpoints necessary have all of these elements. For example, some endpoints may have a microphone and a speaker, other endpoints may have a microphone without a speaker, and still other endpoints may have a speaker without a microphone. While certain connections are shown between elements within the endpoint, the elements may be interconnected in any manner desired, such as via a common bus.

The DSP unit 701 may process audio in analog and/or digital form. For example, if the endpoint includes the microphone 702, electrical signals from the microphone 702 (representing sound picked up by the microphone 702) may be received by the DSP unit 701, which may convert (if originally analog) the electrical signals to audio data, process the electrical signals and/or audio data as desired, and provide the audio data to the communication interface 704 for packaging into one or more datagrams that are then sent to the hub 101. For example, the communication interface 704 may place the audio data in one or more first type of (e.g., UDP) datagrams, encapsulate the one or more first datagrams into one or more second type of (e.g., IP) datagrams, and send the resulting datagrams to the hub 101.

Where the endpoint includes the speaker 703, one or more datagrams may be received from the hub 101 via the communication interface 704, which may unpack the audio data from the datagram(s) and send the audio data to the DSP unit 701 for any further desired processing. The DSP unit 701 may further convert the processed audio data to analog electrical signals suitable for driving the speaker 703.

The controller 705 may control any or all of the functionality, processes, and/or features of the endpoint. For example, the controller 705 may control the DSP unit 701 and/or the communication interface 704. The controller 705 may include, for example, one or more processors that execute the computer-readable instructions stored in the memory 706. Executing the instructions may cause the endpoint to perform any of its functionality as described herein.

Figure 8:
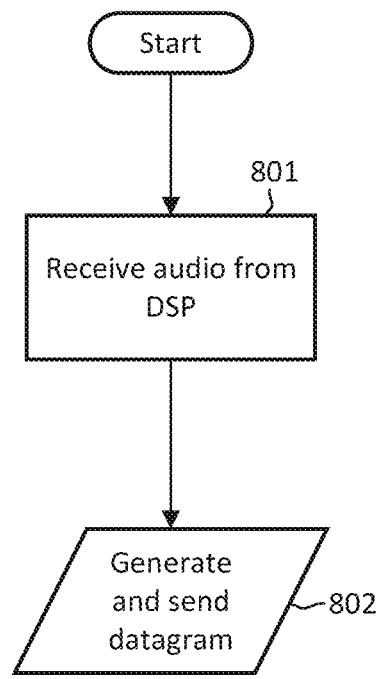
FIG. 8 shows an example flowchart for a process of sending audio via one or more datagrams, which may be performed by one or more devices of an audio system such as the audio system of FIG. 1.

FIG. 8 shows an example flowchart for a process of sending audio via one or more datagrams, which may be performed by one or more devices of an audio system such as the audio system 100. For example, the process of FIG. 8 may be performed by an endpoint, such as any of the endpoints 102-106, when sending audio data to another device such as the hub 101. The process of FIG. 8 may be performed by and/or otherwise controlled by the controller 705 of the endpoint. At step 801, the DSP unit 701 may generate processed audio data based on, for example, sound picked up by the microphone 702. The processed audio data may be sent to, and received by, the communication interface 704. At step 802, the communication interface 704 may package the audio data into one or more datagrams, and send those one or more datagrams to the hub 101. The communication interface 704 may send the one or more datagrams at times that are based on a local clock. For example, the communication interface 704 may send each datagram at one of the local clock cycles. For example, if the local clock is an X Hz clock, and if audio data is available to be sent, the communication interface 704 may send datagrams to the hub 101 at a rate of X Hz. If no audio data is available to be sent for a particular local clock cycle, then no datagram may be sent during that local clock cycle. The local clock cycle may be, or be synchronized with, a communication link clock cycle that may be established for (or by) the data communication path between the endpoint and the hub 101.

In addition to sending audio data to the hub 101, the endpoints 102-106 may also receive audio data from the hub 101. For example, the hub 101 may receive audio data in datagrams from one or more of the endpoints 102-106 and forward the audio data (or a further processed version of the audio data) in datagrams to one or more others of the endpoints 102-106.

Figure 9:
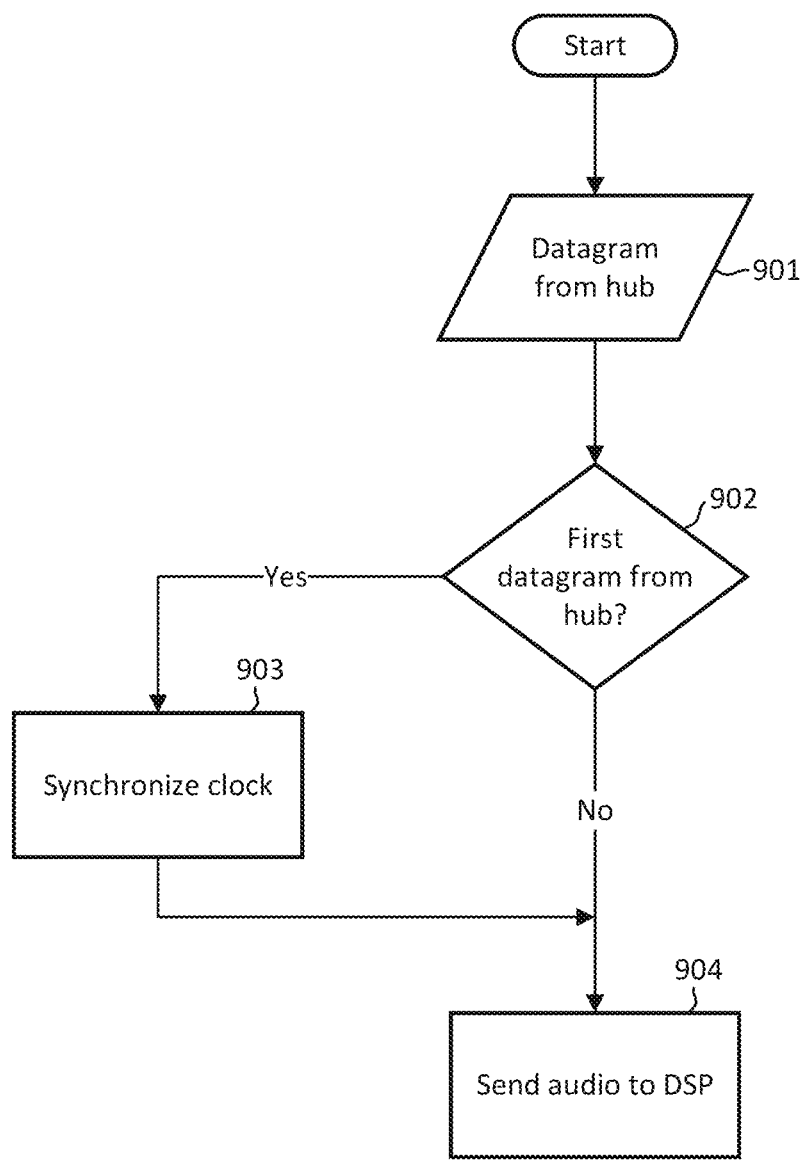
FIG. 9 shows an example flowchart for a process of receiving audio via one or more datagrams, and for synchronizing a clock, which may be performed by one or more devices of an audio system such as the audio system of FIG. 1.

For example, FIG. 9 shows an example flowchart for a process of receiving audio via one or more datagrams, and for synchronizing a local clock. The hub 101 and each endpoint 102-106 may run its own local clock, for example, using a phase-locked loop (PLL) circuit. The local clocks of the hub 101 and/or the endpoints 102-106 may be of the same clock frequency. The local clocks of the hub 101 and/or the endpoints 102-106 may be independently free-running clocks (asynchronous), or they may be periodically or continuously synchronized with one another (synchronous). The process of FIG. 9 may be performed by one or more devices of an audio system such as the audio system 100. For example, the process of FIG. 9 may be performed by an endpoint, such as any of the endpoints 102-106, when receiving audio data from another device such as the hub 101. The process of FIG. 9 may be performed by and/or otherwise controlled by the controller 705 of the endpoint. At step 901, the endpoint may receive a datagram sent by the hub 101. At step 902, the endpoint may determine whether the datagram is the first datagram that the endpoint has received from the hub 101, for example the first datagram received from the hub 101 since the endpoint was first powered up, reset, or connected to the hub 101. If so, then at step 903 the endpoint may synchronize its local clock to the timing of the received datagram. For example, the local clock may be modified to align with the timing (e.g., the beginning) of the received datagram. For example, the local clock may be phase-shifted such that the clock cycles align with the bit timing of one or more bits of the datagram, and/or the local clock may be set to a particular value, such as zero, corresponding to the timing of the datagram (for example, corresponding to the beginning of the datagram). The local clock may have a frequency equal to or otherwise based on an expected data rate of communication between the endpoint and the hub 101. For example, the local clock of each endpoint may have a frequency that is equal to or otherwise based on a frequency of $1/T_C$, where $T_C$ is discussed below with respect to FIG. 10. For example, the local clock frequency may be a multiple of $1/T_C$. The local clock of each endpoint and/or of the hub 101 may further be adjusted based on a common clock or other information that is part of the communication protocol of the communication link between the endpoints and the hub 101, such as a clock of the communication link. For example, if the endpoints and the hub 101 are interconnected via USB, then each local clock may be adjusted to align in phase and/or value with USB start-of-frame (SOF) or bus interval signals, which may be considered examples of a communication link clock. The local clock of each endpoint may be the same local clock used by the endpoint to send datagrams to the hub 101. If the datagram is not the first received datagram, then step 903 may be skipped. At step 904, the audio data may be unpackaged from the datagram and sent to the DSP unit 701 for further processing. In addition to or as an alternative to the clock synchronization of FIG. 9, the hub 101 may send information about its own local clock to each of the endpoints, which may synchronize their own local clocks in accordance with the clock information received from the hub 101. The clock information sent by the hub 101 may include, for example, an indication of a clock frequency to be used by the endpoint, an indication of a clock phase to be used by the endpoint, an indication of a clock value to be used by the endpoint, etc. The hub 101 may send the clock information once (for example, as part of an endpoint connection process to the hub 101) or more than once, such as periodically. For example, the hub 101 may send the clock information to all connected endpoints once every ten seconds, or once per minute, or once per hour, or over any other time period as desired.

Figure 10:
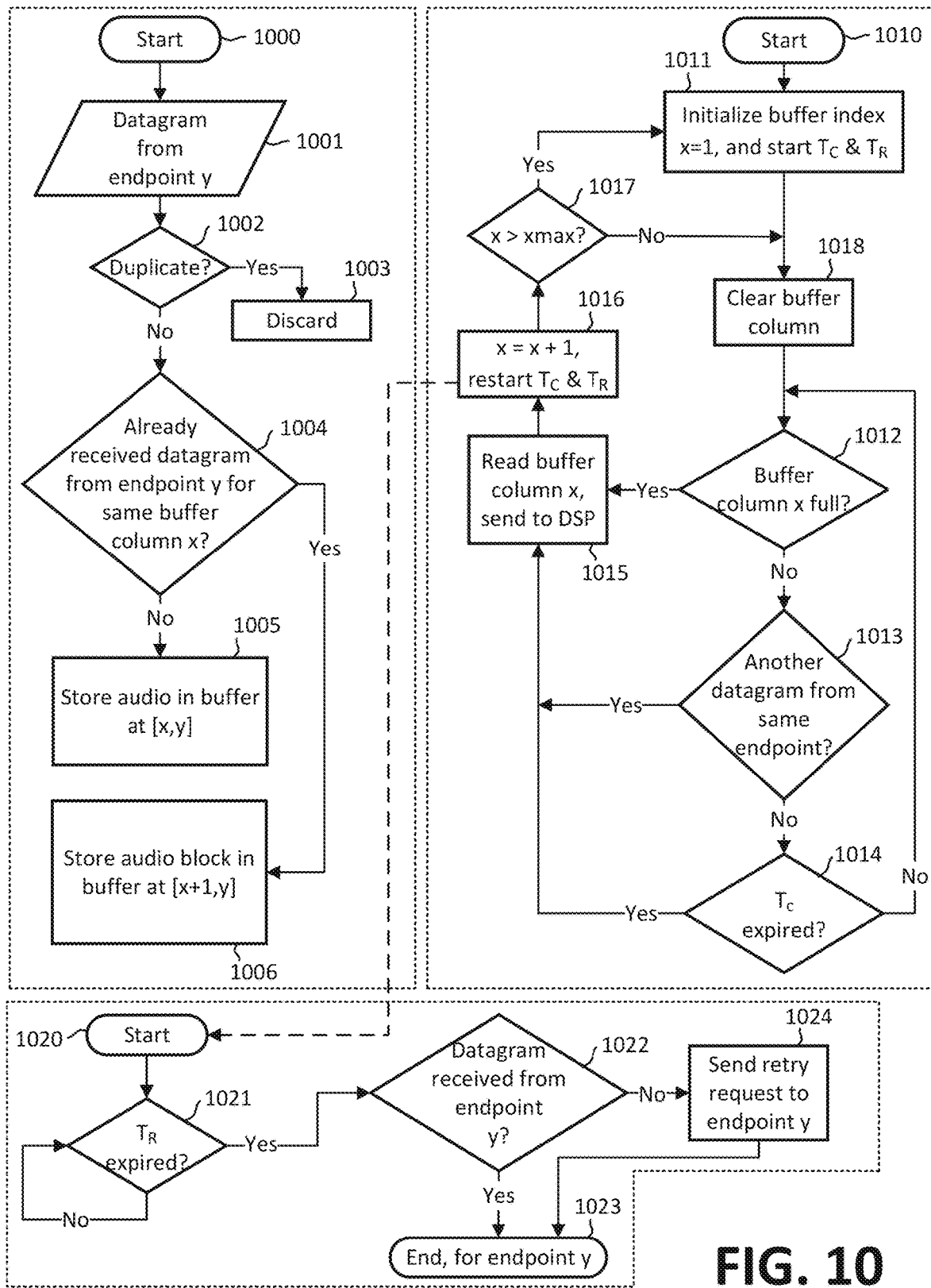
FIG. 10 shows an example flowchart for a process of receiving audio via one or more datagrams, and for populating a two-dimensional buffer, which may be performed by one or more devices of an audio system such as the audio system of FIG. 1.

FIG. 10 shows an example flowchart for a process of receiving audio via one or more datagrams, and for populating a two-dimensional buffer, such as the buffer shown in FIG. 5. The process of FIG. 10 may be performed by one or more devices of an audio system such as the audio system 100. For example, the process of FIG. 10 may be performed by a hub, such as the hub 101, when receiving audio data from another device such as one or more of the endpoints 102-106. The process of FIG. 10 may be performed by and/or otherwise controlled by the controller 203 of the endpoint. FIG. 10 shows three parallel processes that may be performed by the hub 101. One of the processes (steps 1000-1006) may be responsible for storing received audio data in the buffer. Another one of the processes (steps 1010-1018) may be responsible for managing the buffer and a buffer index. Another one of the processes (steps 1020-1024) may be responsible for retry requests where a datagram has not been received within an expected timeframe from an endpoint. Each of these processes may be performed in parallel with one another (e.g., simultaneously) by the hub 101. Also, as indicated by broken lines, certain aspects of the various processes may affect or depend on aspects of others of the various processes.

In describing these processes of FIG. 10, the current buffer position (e.g., columns as shown in FIG. 5) will be referred to as variable x, which will also be referred to as the buffer index; and an endpoint will be indexed by the variable y, which may correspond to row y in FIG. 5. Each endpoint may be assigned a different value of y. For example, referring to the audio system of FIG. 1, endpoint 102 may be assigned y=1, endpoint 103 may be assigned y=2, endpoint 104 may be assigned y=3, endpoint 105 may be assigned y=4, and endpoint 106 may be assigned y=6. These assignments are entirely arbitrary and for illustration purposes only. There may be any number of connected endpoints, at least up to the number of endpoints supported by the buffer (for example, the number of rows in the buffer). A buffer location [x, y] will refer to the location within the buffer at column x, row y. Each buffer location may be large enough to hold the audio data from one datagram. However, each buffer location may be of any size as desired. For example, if an endpoint assigned to y=2 has send a datagram while the buffer index is at x=3, then audio data in that datagram may be stored in the buffer at buffer location [x=3, y=2]. The hub 101 may know which endpoint sent a given datagram based on header information in the datagram. For example, each endpoint may have a unique address within the audio system, such as an IP address, and the datagram header may identify the address of the endpoint. For example, where each endpoint has a unique IP address within the audio system, the source IP address field in IP datagram 400 may indicate which endpoint sent a datagram.

As an overview, the various processes of FIG. 10 may work together as follows. Datagrams containing audio data may be received by the hub 101 from various endpoints over time. The hub 101 may track buffer index x to be the current column of its buffer into which the audio data is to be populated, at the respective buffer rows assigned to the endpoints sending the datagrams. In general, each column may have a particular default or maximum duration during which it may be populated. This duration is referred to as duration $T_C$, which may be tracked by a timer. During a duration $T_C$, the current buffer column x may be populated with incoming audio data from the endpoints. At the expiration of each duration $T_C$, the buffer column x may be read out (regardless of how full the column is), and the buffer index may be incremented (e.g., x=x+1). If the value of x reaches the end of the buffer (e.g., the last column), then x may be initialized back to the beginning of the buffer (e.g., x=1, or the first column). In general, $T_C$ may be set to a duration that is appropriate such that the hub 101 may reasonably expect each endpoint to send one datagram per value of x. Moreover, the endpoints may be configured to send their datagrams once every period $T_C$. In such a case, the hub may expect to increment the buffer index x every duration $T_C$ by default.

The process of FIG. 10 may be based on an assumption that the communication path(s) between the endpoints and the hub 101 are normally low-latency path(s). For example, it may be expected that the communication path(s) have a latency substantially smaller than $T_C$, such as one-half or one-tenth of $T_C$ or even smaller. Thus, it may be reasonable to expect that the incoming datagrams would be sent from an endpoint and received by the hub 101 within a duration that is substantially smaller than the duration of $T_C$. If the endpoints and the hub 101 are synchronized in frequency such that datagrams from an endpoint are normally sent once every $T_C$, then it may be expected that one datagram per endpoint may be received in each period $T_C$. Moreover, if the endpoints and the hub 101 are synchronized in phase, such that the endpoints send each datagram at or just after the beginning of each period $T_C$ of the hub, then it may further be expected that the normal one datagram per endpoint may be normally received at or near the beginning of each period $T_C$ of the hub 101. Thus, as described herein, it may be desirable to synchronize the frequency of datagrams being sent by the endpoints with the frequency of periods $T_C$ of the hub, and/or to synchronize the phase, e.g., the start, of each period $T_C$ of the hub 101 with a clock of each endpoint such that the datagrams are sent and/or received within a predictable timeframe within each duration $T_C$ of the hub 101. An example of such synchronization between the hub 101 and the endpoints is discussed above with respect to FIG. 9.

However, in practice, and even when such synchronization between the hub 101 and the endpoints is achieved, the incoming datagrams may not always follow the designed-for or other expected timing. For example, a connection between an endpoint and the hub 101 may be congested or delayed more than usual, or there may be a problem with the functioning of an endpoint. Thus, there may be exceptions built in to the above general principals. For example, if all of the connected endpoints send their datagrams very quickly, before $T_C$ expires, then buffer column x would become fully populated before $T_C$ expires. For efficiency and to potentially maintain a form of synchronization of the hub 101 buffer with the timing of the datagrams received from the endpoints, the buffer column may be read out and x may be incremented early, before $T_C$ expires. As another example of an exception, if more than one set of audio data (e.g., two datagrams) is received from the same endpoint during the same duration $T_C$ (e.g., while x is at a particular value), then there is the question of what to do with the extra audio data. In this situation, the buffer column may be read out prior to $T_C$ expiration, x may be incremented, and the extra (e.g., second) set of audio data from that endpoint may then be populated into the buffer column corresponding to the next incremented value of x so that it is not lost. Subsequent audio data received from others of the endpoints would likewise be populated into the buffer column at the (new) value of x. Thus, even when the hub 101 receives datagrams from the endpoints at unexpected times (e.g., earlier or later than expected), the hub 101 may control its buffer to synchronize the received datagrams by binning/categorizing them according to their times of receipt by the hub 101 into buffer slots (e.g., columns) that are selected based on one or more rules such as based on the process described herein with respect to FIG. 10.

Moreover, there may be situations where an endpoint does not send a datagram as expected for a given value of x. This may occur for a variety of reasons. For example, the datagram may have been delayed or lost, or there may simply be no audio data to be sent at that time (e.g., the microphone of the endpoint is picking up no sound), or the endpoint may have become disconnected. In the situation where a datagram has not been received as expected from a given endpoint, the hub 101 may be configured to request the endpoint to retry sending a datagram, potentially prior to the expiration of the buffer column population duration $T_C$. Thus, the hub 101 may, in some circumstances, send a retry request to an endpoint from which an expected datagram has not yet been received. For example, if a datagram has not been received from an endpoint within a duration $T_R$, which may be shorter than duration $T_C$, then the hub 101 may send the endpoint a retry request. The duration $T_R$ may overlap with and be an initial portion of duration $T_R$, and so a timer tracking $T_R$ may be running in parallel with a timer tracking $T_C$. In response to the retry request, the endpoint may re-send the last-sent datagram to the hub 101. However, it is possible that the retry request may result in both an original datagram and a re-sent datagram being received by the hub 101. In this case, the hub 101 may be configured to recognize a duplicate datagram, which may be discarded. Examples of how the above features may be implemented are described below with reference to the various steps shown in FIG. 10.

The one or more processors of the controller 203 of the hub 101 may implement separate real-time threading for dealing with receiving datagrams and for dealing with sending datagrams. For example, a first real-time thread may be used for dealing with receiving datagrams, and a second real-time thread, independent from the first thread, may be used for sending out datagrams. Thus, a first real-time thread may be used by the hub 101 for sending audio data, and a second real-time thread may be used by the hub 101 for receiving audio data, wherein the second real-time thread is separate from the first real-time thread. For example, the first real-time thread may implement some or all of the audio data receiving process (steps 1000-1006), and the second real-time thread may implement some or all of the buffer management and sending process (steps 1010-1018). The first real-time thread may also implement the retry process (steps 1020-1024). However, one or more real-time threads may be used to implement any one or more combinations or subcombinations of the steps described herein with respect to FIG. 10.

Referring to the audio data receiving process (steps 1000-1006) of FIG. 10, at step 1000 this process may start, and at step 1001 a datagram may be received from endpoint y. While only a single flowchart thread for a given value of y is shown in FIG. 10, it will be understood that the processes in FIG. 10 may be performed for each of the connected endpoints, such as the endpoints assigned to y=1 through 6 in this example. Thus, for example, step 1001 may be performed for y=1, y=2, etc., independently and/or simultaneously. The process of steps 1000-1006 may be performed for each datagram received from any of the endpoints.

At step 1002, it may be determined whether the received datagram is a duplicate of an earlier-received datagram. This may be determined, for example, by comparing the data (e.g., bits) within the datagram with the data (e.g., bits) in the previously-recently received datagram for endpoint y. If there is a match, then the newly-received datagram may be considered a duplicate. If the datagram is considered a duplicate, the datagram may be discarded. However, if the datagram is not considered a duplicate, then the process may move, for that value of y, to step 1004.

At step 1004, it may be determined whether the hub 101 already received a previous datagram from that endpoint y for the same buffer index value of x. As will be described below, the value of x may be controlled by the process of steps 1010-1018. If it is determined that two datagrams have not been received from the same endpoint y for the same buffer index value x, then the process moves to step 1005 for that endpoint y. At step 1005, the audio data in the datagram may be stored in the buffer at buffer location [x, y].

However, if at step 1004 it is determined that two datagrams have been received from the same endpoint y for the same buffer index value x, then the process moves to step 1006 for that endpoint y. At step 1006, the audio data in the datagram may be stored in the buffer at buffer location [x+1, y]. This step may occur when the endpoint y sends two datagrams very quickly in sequence, before the buffer index x has had a chance to increment at step 1016, and allows the buffer to store the audio data in the next buffer location (in column x+1) for that endpoint y without having to drop audio data.

Referring to the buffer management and sending process (steps 1010-1018) of FIG. 10, at step 1010, the process may start. At step 1011, the value of x may be initialized to a starting value corresponding to a starting buffer index position. In this example, the starting buffer index position is the left-hand-most column in the buffer of FIG. 5, which is x=1. However, buffer index values and columns (and rows) may be enumerated, addressed, or otherwise labeled with any numerical, alphanumerical, and/or other values as desired.

Step 1011 may also start or restart two timers: $T_C$ and $T_R$. Timer $T_C$ represents a maximum time duration within which a datagram may be received for placement into the current buffer column. In general (albeit with exceptions as described herein), if a datagram is received within a time duration corresponding to a particular buffer index value (e.g., a particular buffer column), then the audio data in that datagram may be populated into that buffer column. For example, the buffer index may be updated (e.g., incremented by one) every period $T_C$. Each time the buffer index is incremented, $T_C$ may be reset. When $T_C$ has passed (e.g., responsive to the timer $T_C$ expiring), the buffer index may be updated (e.g., incremented by one). The length of $T_C$ may be of any value, for example 10 ms, or 16 ms, or 20 ms, or any other value. Some of the steps discussed below describe an example of how and when the buffer index may be updated.

Timer $T_R$ represents a time duration after which a retry may be requested, in other words, a retry waiting period. $T_R$ may be reset along with $T_C$ each time the buffer index is updated. The duration of $T_R$ may be less than the duration of $T_C$. In other words, the duration of the retry waiting period $T_R$ may be less than the maximum buffer position pointing period $T_C$. For example, where $T_C$ has a duration of 16 ms, then $T_R$ may have a duration of less than 10 ms, such as 1 ms or 0.5 ms. An example use of $T_R$ for retry requests will be discussed below.

Once the buffer index has been initialized and the timers $T_C$ and $T_R$ have been started or restarted, then at step 1018, at least column x of the buffer may be cleared (e.g., any audio data in that buffer column may be erased or indicated as invalid or old). Only column x of the buffer may be cleared, or the entirety of the buffer may be cleared, or any portion in between.

Next, at step 1012, it may be determined whether the buffer at current buffer index x (e.g., column x) is full. A column of the buffer may be considered full when the column is populated with audio data from all of the connected endpoints. The number of connected endpoints may be less than the number of rows of the buffer. For example, if the buffer has possible rows y=1 through y=10. then there may be ten rows available. However, if only five endpoints are connected, then the endpoints may be assigned to just five of those rows, for example rows y=1 through y=5 (or, for example, rows y=1, 3, 5, 7, and 9). In such an example, the current buffer column may be considered full at step 1012 when all five of the rows assigned to the five connected endpoints are populated with audio data. For example, FIG. 6 shows that the current buffer position x=1 (indicated by the downward arrow above the buffer array) and that buffer rows y=1, 2, 3, and 5 are populated with audio data. If an endpoint is assigned to buffer row y=4, then at this point, step 1012 would determine that the buffer column is not full. However, if audio data was also populated at y=4 for buffer index x=1, then step 1012 would determine that the buffer column is full.

If step 1012 determines that the buffer column x is full, then at step 1015, the hub 101 (e.g., the controller 203) may read the buffer at column x (including all audio data populated rows for that buffer column x) and send that read audio data to the DSP unit 205 for further processing. For example, where multiple audio data was read from multiple rows of the buffer at a given column x, each row may be considered a different channel of audio, and the DSP unit 205 may mix those multiple channels into a single channel or otherwise into fewer channels. It should be noted that audio data for any given endpoint may be mono-channel audio data or stereo-channel audio data. Then, the processed audio data may be packaged (e.g., by the controller 203 and/or by the network interface 201) into one or more datagrams and sent to one of more desired destinations. The one or more desired destinations for the one or more datagrams may include, for example, the network 150 and/or one or more of the endpoints 102-106.

At step 1016, the buffer index x is incremented by one, and timers $T_C$ and $T_R$ are restarted. Then, at step 1017, it may be determined whether x is greater than a maximum value xmax. If so, then this means that the end of the buffer has been reached and so the process returns to step 1011 where x is re-initialized to its starting point (e.g., x=1) and the buffer at column x is cleared. Note that while the above-described path through the process (steps 1010, 1011, 1018, 1012, 1015, and 1016) does not require timers $T_C$ or $T_R$, these timers may be used for other paths through the process, as will be described below.

Returning to step 1012, if it is determined that the column at position x is not full, then the process moves to step 1013. At step 1013, it may be determined whether another (e.g., a second) datagram or audio data has been received from the same endpoint for the current position x. This may occur when an endpoint has sent two datagrams very quickly, before the buffer index has had a chance to increment. If it is determined that another datagram or audio data has been received from the same endpoint for the current position x, then the process moves to step 1015. This process path represents the situation where the buffer index is to be incremented early (before timer $T_C$ expires) because there is an extra set of audio data received from an endpoint for the same buffer position x. This situation also corresponds to the "yes" branch of step 1004 and to step 1006, in which it has also been determined that another datagram or another set of audio data has been received from the same endpoint during the same value of x.

Returning to step 1013, if it is determined that another datagram or audio data from the same endpoint has not been received for the current position x, then the process moves to step 1014. At step 1014, it is determined whether timer $T_C$ has expired. If not, then the process returns to step 1012, and the process may then loop through steps 1012-1014 until timer $T_C$ has expired or until a "yes" branch is taken from steps 1012 or 1013. If timer $T_C$ has expired, then the process moves to step 1015 and the buffer at column x is read out.

Referring to the retry process (steps 1020-1024) of FIG. 10, at step 1020, the retry process may start, and may be triggered in response to timer $T_R$ being reset in step 1016. At step 1021, it may be determined whether timer $T_R$ has expired. If not, then timer $T_R$ is retested at step 1021 until it has been determined to be expired. If it is determined that timer $T_R$ has expired, then the process moves to step 1022. At step 1022, it may be determined whether a datagram or audio data has been received from each endpoint and populated into the current column x of the buffer. This determination may be made for each value of y corresponding to a connected endpoint. In other words, for each [x, y] location within the buffer, where x is the current value of x and y may be all values corresponding to connected endpoints, it may be determined whether that buffer location is populated with audio data. For each endpoint y that has sent a datagram or audio data populating current buffer location x, the process may end at step 1023. For each endpoint y that has not sent a datagram or audio data to populate current buffer position x, then the process moves to step 1024, in which the hub 101 may send a retry request to that endpoint y, and then the process may end at step 1023. The retry request may be any message that may be understood by the endpoint and in response to which the endpoint may re-send the most previously-sent datagram.

As mentioned above, the DSP unit 205 of the hub 101 may mix multiple audio channels. For example, where multiple different endpoints send datagrams to the hub 101, and those datagrams populate the same column within the hub's buffer, the audio data in that column may be read out and transferred to the DSP unit 205. For example, the audio data in the buffer located at multiple different y values, for the same x value, may be read out and transferred to the DSP unit 205. This is represented, for example, by step 1015. The DSP unit 205 may mix or otherwise combine the read-out audio data to generate combined audio data. For example, where the read-out audio data include first audio data that was included in a first datagram received from a first endpoint and second audio data that was included in a second datagram received from a second endpoint, the DSP unit 205 may combine (e.g., mix) the first audio data with the second audio data to generate combined third audio data. In other words, the third audio data may be generated based on the first audio data and the second audio data. For example, the first audio data and the second audio data may be summed together, or one may be subtracted from the other, where the summing or the subtracting may be a weighted summing or subtracting. This third audio data may be inserted into the payload of a datagram, which may be sent to another destination such as the network 105 and/or one or more of the endpoints. For example, the third audio data may be inserted into the payload of a UDP datagram, and that UDP datagram may be encapsulated into an IP datagram. The resulting IP/UDP datagram may be sent to another destination, such as the network 104 and/or one or more of the endpoints.

An example of how the processes of FIG. 10 may be implemented is now described with reference to FIGS. 6, 11, and 12. For the following discussion, it will be assumed that there are five endpoints connected to the hub 101, and that the five endpoints are each assigned a different row (y value) in the buffer of the hub 101. For example, the endpoint 102 may be assigned y=1, the endpoint 103 may be assigned y=2, the endpoint 104 may be assigned y=3, the endpoint 105 may be assigned y=4, and the endpoint 106 may be assigned y=6. The hub 101 may decide on the buffer assignments, which may be modified over time such as when endpoints disconnect and/or new endpoints connect to the hub 101. For example, the hub 101 may assign the lowest available value of y (a value of y that is not currently assigned to an endpoint) to any newly-connecting endpoint. If an endpoint is disconnected, then the hub 101 may consider the y value assigned to that disconnected endpoint free to use for a subsequently-connecting endpoint. The hub 101 may determine that an endpoint has connected based on the particular connecting/handshaking protocol used for communicating between the hub 101 and the endpoint. When the hub 101 receives a first datagram from a new endpoint, the datagram may include in its header an indication that is unique to that endpoint within the audio system 100, such as an IP address of the endpoint. The hub 101 may associate the IP address of the endpoint with an assigned value of y, and track that association such as in a buffer assignment table stored in the memory 206. The hub 101 may determine that an endpoint has disconnected from the hub 101 based on, for example, the hub 101 not receiving any data (for example, any audio data) from the endpoint for a certain amount of time and/or for a certain number of consecutive buffer cycles of the hub 101. The certain amount of time may be predetermined (e.g, a threshold amount of time) and may be of any value, for example, one hundred milliseconds, or one second, or five seconds, or shorter or longer. A buffer cycle may correspond to a particular value of x. Thus, a first buffer cycle may correspond to x=1, a second buffer cycle may correspond to x=2, a third buffer cycle may correspond to x=3, etc. The certain number of buffer cycles may be predetermined (e.g., a threshold number of buffer cycles) and may be of any value, for example, three buffer cycles, four buffer cycles, five buffer cycles, or a smaller or greater number of buffer cycles.

Referring to FIG. 6, while the buffer index is at x=1, the hub 101 has received datagrams from four of the five endpoints that are assigned to y values of 1, 2, 3, and 5. Thus, the hub 101 has not yet received a datagram from the endpoint assigned to y=4 (in this example, the endpoint 105). In this case, if $T_R$ has expired, the hub 101 may send a retry request to the endpoint 105, as per at least steps 1021-1024 of FIG. 10. If no datagram is received from the endpoint 105 after the retry request and by the time that TC expires for x=1, then the buffer at column x=1 is read, and x is incremented to a value of 2. The receiving of the datagrams, populating of the buffer with audio data, and tracking of the buffer index and timers $T_C$ and $T_R$ may be performed, for example, by at least steps 1001-1005 and 1012-1016 of FIG. 10.

Figure 11:
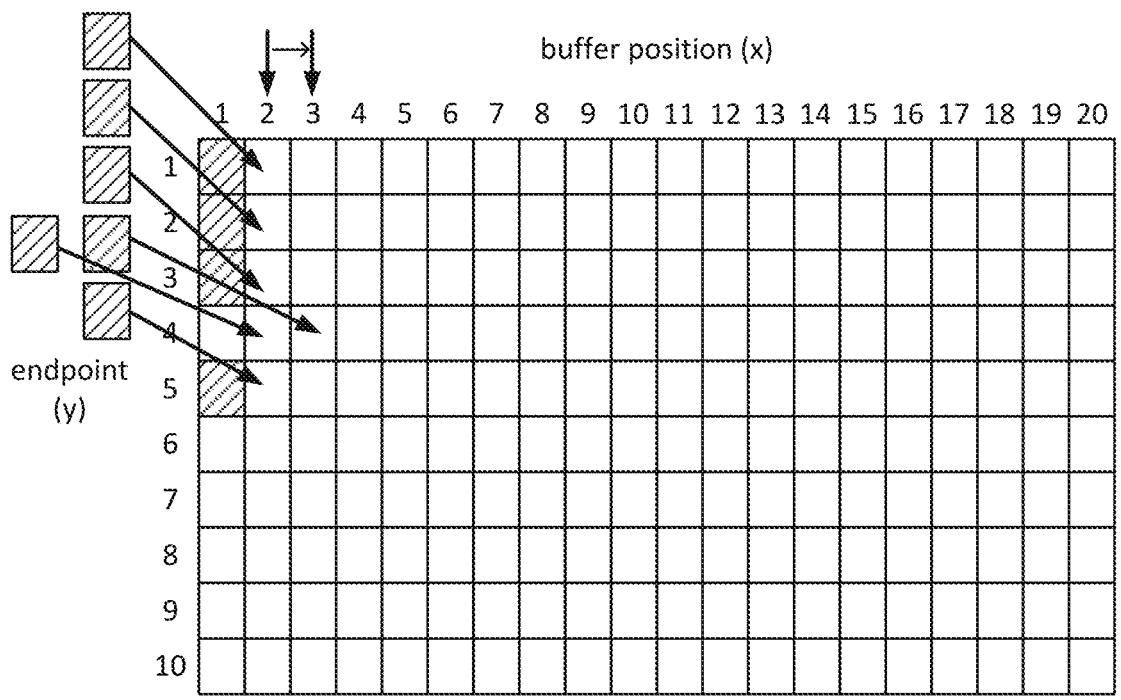
FIGS. 11 and 12 show examples of audio data populating further columns of the two-dimensional buffer of FIG. 5.

Referring to FIG. 11, when the buffer index is at x=2, each of the five endpoints sends a datagram, which is populated into the respective buffer locations [x, y]. However, the endpoint 105 (assigned to y=4) has also sent an extra datagram while x=2. Assuming that the extra datagram is not a duplicate of the previous datagram from the endpoint 105, then the buffer at x=2 is read, x is incremented to be x=3, and the extra datagram populates its audio data into the new buffer column at [x=3, y=4]. This may be performed, for example, by at least steps 1001-1006, 1012, 1015, and 1016 of FIG. 10.

Figure 12:
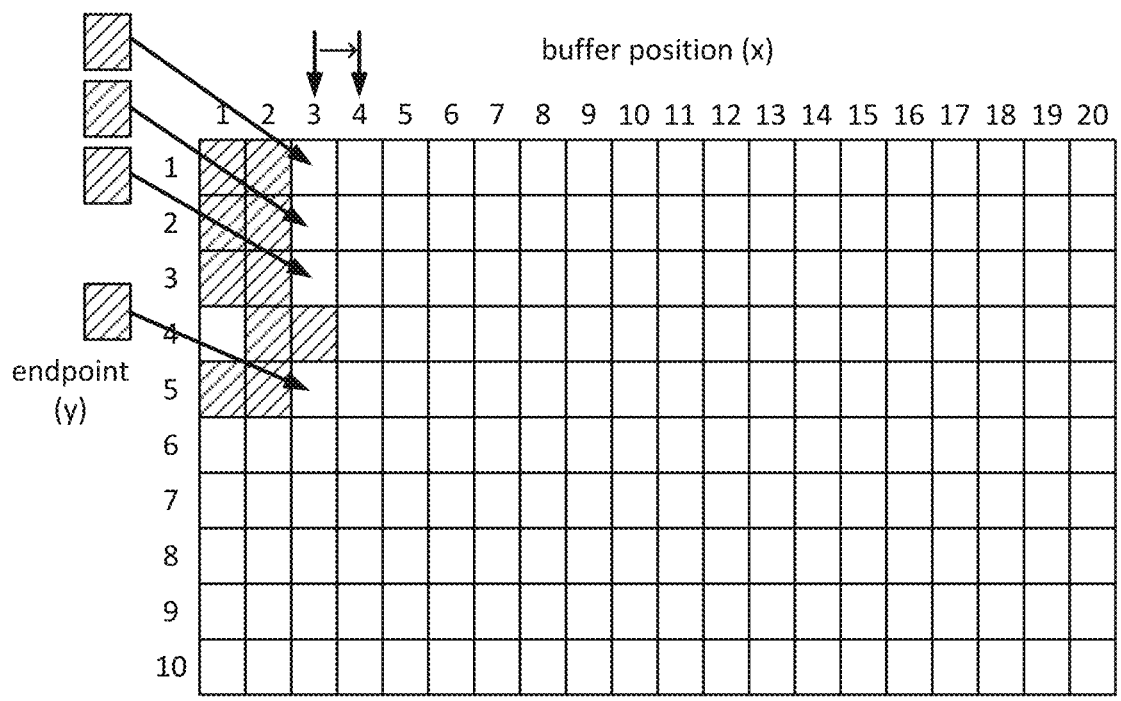

Referring to FIG. 12, now that the buffer index is at x=3 and y=4 has been populated with audio data as described above, the hub 101 may receive a further datagram from each of the remaining endpoints corresponding to y=1, 2, 3, and 5. In this situation, the hub 101 may populate the remainder of the column at x=3 with the respective audio data, determine that the column at x=3 is full, read out the column, and increment x such that x=4. This may be performed, for example, by at least steps 1001-1005 and 1012-1016 of FIG. 10.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving, by a first device and in a plurality of time windows, a plurality of Internet Protocol (IP) datagrams from a plurality of other devices, wherein each of the IP datagrams encapsulates a User Datagram Protocol (UDP) datagram that comprises audio data, and wherein the first device and the plurality of other devices are synchronized in phase;
determining a first subset of IP datagrams, of the plurality of IP datagrams, that is received within a first time window, of the plurality of time windows, and from a subset of the plurality of other devices;
combining audio data of the first subset of IP datagrams, received within the first time window of the plurality of time windows, to generate first combined audio data; and
sending a first datagram comprising the first combined audio data.

2. The method of claim 1, wherein the first device is connected to each of the plurality of other devices in a hub-and-spoke topology.

3. The method of claim 1, wherein each of the plurality of other devices comprises a microphone, and wherein the audio data corresponding to each of the plurality of other devices is based on sound detected by the microphone.

4. The method of claim 1, further comprising:
determining a second subset of IP datagrams, of the plurality of IP datagrams, that is received within a second time window, of the plurality of time windows, and subsequent to the first time window;
combining audio data of the second subset of IP datagrams, received within the second time window of the plurality of time windows, to generate second combined audio data; and
sending a second datagram comprising the second combined audio data.

5. The method of claim 1, wherein the receiving the plurality of IP datagrams comprises receiving the plurality of IP datagrams from the plurality of other devices via a same networking protocol port.

6. The method of claim 1, wherein the sending the first datagram comprises sending an IP datagram encapsulating a UDP datagram that comprises the first combined audio data.

7. The method of claim 1, further comprising ending the first time window based on a determination that at least some of received audio data corresponds to all of the plurality of other devices.

8. The method of claim 1, wherein the combining comprises combining the audio data of the first subset of IP datagrams based on a determination that the first time window has expired.

9. The method of claim 1, further comprising synchronizing a start of the first time window with a time that each of the plurality of other devices sends one of the IP datagrams.

10. A method comprising:
receiving, by a first device and in a plurality of time windows, a plurality of datagrams from a plurality of other devices, wherein each of the plurality of datagrams encapsulates a User Datagram Protocol (UDP) datagram that comprises audio data, and wherein the first device and the plurality of other devices are synchronized in phase;

synchronizing the audio data using a multi-dimensional buffer indexed to the plurality of other devices and indexed to the plurality of time windows; and for each time window of the plurality of time windows:
combining audio data, in datagrams as received within the time window from a subset of the plurality of other devices, to generate combined audio data; and
sending a datagram comprising the combined audio data.

11. The method of claim 10, further comprising ending a first time window of the plurality of time windows based on a determination that datagrams have been received, by the first device, from all of the plurality of other devices during the first time window.

12. The method of claim 10, wherein the multi-dimensional buffer comprises a two-dimensional buffer, which comprises a first dimension indexed to the plurality of time windows and a second dimension indexed to the plurality of other devices.

13. The method of claim 10, wherein the combining the audio data in datagrams as received within the time window comprises mixing the audio data in datagrams as received within the time window.

14. The method of claim 10, wherein for each time window of the plurality of time windows, the sending the datagram comprising the combined audio data comprises sending a datagram that encapsulates a UDP datagram that comprises the combined audio data.

15. The method of claim 10, wherein for each time window of the plurality of time windows, the combining the audio data in datagrams as received within the time window to generate the combined audio data comprises generating the combined audio data by at least applying digital signal processing in addition to combining the audio data in datagrams as received within the time window.

16. A first device comprising:
one or more processors; and
memory storing instructions that, when executed by the one or more processors, cause the first device to:
receive, in a plurality of time windows, a plurality of Internet Protocol (IP) datagrams from a plurality of other devices, wherein each of the IP datagrams encapsulates a User Datagram Protocol (UDP) datagram that comprises audio data, and wherein the first device and the plurality of other devices are synchronized in phase;
determine a first subset of IP datagrams, of the plurality of IP datagrams, that is received within a first time window, of the plurality of time windows, and from a subset of the plurality of other devices;
combine audio data of the first subset of IP datagrams, received within the first time window of the plurality of time windows, to generate first combined audio data; and
send a first datagram comprising the first combined audio data.

17. The first device of claim 16, wherein the instructions, when executed by the one or more processors, cause the first device to:
determine a second subset of IP datagrams, of the plurality of IP datagrams, that is received within a second time window, of the plurality of time windows, and subsequent to the first time window;
combine audio data of the second subset of IP datagrams, received within the second time window of the plurality of time windows, to generate second combined audio data; and
send a second datagram comprising the second combined audio data.

18. The first device of claim 16, wherein the instructions, when executed by the one or more processors, cause the first device to end the first time window based on a determination that at least some of received audio data corresponds to all of the plurality of other devices.

19. The first device of claim 16, wherein the instructions, when executed by the one or more processors, cause the first device to combine the audio data of the first subset of IP datagrams by causing combining the audio data of the first subset of IP datagrams based on a determination that the first time window has expired.

20. The first device of claim 16, wherein the instructions, when executed by the one or more processors, cause the first device to synchronize a start of the first time window with a time that each of the plurality of other devices sends one of the IP datagrams.

* * * * *